(12) United States Patent
Huster

(10) Patent No.: US 7,201,131 B2
(45) Date of Patent: Apr. 10, 2007

(54) CRANKCASE COVER PLATE

(75) Inventor: Joachim Huster, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 11/316,553

(22) Filed: Dec. 22, 2005

(65) Prior Publication Data

US 2006/0096566 A1   May 11, 2006

Related U.S. Application Data

(63) Continuation-in-part of application No. PCT/EP2004/007005, filed on Jun. 29, 2004.

(30) Foreign Application Priority Data

Jul. 2, 2003   (DE) ............................. 103 29 762

(51) Int. Cl.
*F02B 75/06* (2006.01)

(52) U.S. Cl. .................. 123/192.2; 123/196 R

(58) Field of Classification Search ............. 123/192.2, 123/196 R, 195 C See application file for complete search history.

(56) References Cited

U.S. PATENT DOCUMENTS

| | | | | |
|---|---|---|---|---|
| 4,766,857 A | * | 8/1988 | Laine et al. ............. | 123/192.2 |
| 5,467,843 A | * | 11/1995 | Esch et al. ................ | 184/6.5 |
| 6,079,383 A | * | 6/2000 | Shirai et al. ............. | 123/192.2 |
| 6,189,499 B1 | * | 2/2001 | Iwata et al. .............. | 123/192.2 |
| 6,752,117 B2 | * | 6/2004 | Purcell et al. ........... | 123/192.2 |
| 6,758,183 B2 | * | 7/2004 | Endo et al. .............. | 123/192.2 |
| 6,880,512 B2 | * | 4/2005 | Hashimoto et al. ...... | 123/192.2 |
| 7,037,088 B2 | * | 5/2006 | Shulver et al. ............ | 417/364 |
| 7,047,927 B2 | * | 5/2006 | Hashimoto et al. ...... | 123/192.2 |
| 2006/0207542 A1 | * | 9/2006 | Takano .................... | 123/192.2 |

* cited by examiner

*Primary Examiner*—Noah P. Kamen
*Assistant Examiner*—Jason Benton
(74) *Attorney, Agent, or Firm*—Klaus J. Bach

(57) ABSTRACT

In a cover plate for obturating a crankcase of an internal combustion engine at the bottom end thereof, which cover plate includes suction areas for collecting engine lubricant and on which a balancing shaft is rotatably supported and driven by the crankshaft of the engine via a gear structure, a first gear pump is arranged at one end of the balancing shaft for pumping lubricant from a collection area at the one end of the balancing shaft and a second gear pump is disposed at the opposite end of the balancing shaft for pumping lubricant from the other collection area at the other end of the balancing shaft, each pump having one of its gears mounted on the balancing shaft.

5 Claims, 3 Drawing Sheets

SECTION CC

KS

CRANKCASE COVER PLATE

This is a Continuation-In-Part Application of International Application PCT/EP2004/007005 filed Jun. 29, 2004 and claiming the priority of German application 103 29 702.6 filed Jul. 2, 2003.

BACKGROUND OF THE INVENTION

The present invention resides in a cover plate for obturating a crankcase at the bottom side thereof, including collection areas for engine lubricant with pumps for withdrawing the lubricant from the collection areas and with a balancing shaft supported on the cover plate and driven by the crankshaft of the engine.

DE 198 55 562 C1 discloses a crankcase with chambers serving as oil storage spaces. DE 100 33 416 C1 discloses a cover plate for obturating this crankcase. On the cover plate, auxiliary equipment is supported such as the pumps for the lubricant supply system and the heat exchangers. On the cover plate, there are two collection locations for collecting the lubricant. From the collection locations, the lubricant is drawn off by the pumps and pumped, via channels formed in the cover plate, to the oil storage spaces of the crankcase. The pumps are three-chamber pumps with two suction chambers and one pressure chamber. It is however problematic with such pumps to provide for safe pumping action also when the engine is in an inclined position.

It is the object of the present invention to provide a crankcase cover plate with a balancing shaft in a manner so as to optimize the lubricant circulation.

SUMMARY OF THE INVENTION

In a cover plate for obturating a crankcase of an internal combustion engine at the bottom end thereof, which cover plate includes suction areas for collecting engine lubricant and on which a balancing shaft is rotatably supported and driven by the crankshaft of the engine via a gear structure, a first gear pump is arranged at one end of the balancing shaft for pumping lubricant from a collection area at the one end of the balancing shaft and a second gear pump is disposed at the opposite end of the balancing shaft for pumping lubricant from the other collection area at the other end of the balancing shaft, each pump having one of its gears mounted on the balancing shaft.

In contrast to the state of the art, the pumps are no longer separate units which are independently mounted on the cover plate but they are directly associated with the balancing shaft. The first and the second pump are arranged each directly at the collection location so that the suction channels in the cover plate are short in comparison with the state of the art. In a particular embodiment of the invention, the first pump is arranged between the spur gear structure driving the balancing shaft and the second pump. With this arrangement, even in connection with high rpm engines, the circumferential pump speeds are relatively low as the gears can be relatively small. Alternatively, the first pump may be formed by the driven gear of the balancing shaft and the second gear. This arrangement may be provided for internal combustion engines with lower top speeds as long as the circumferential speed of the drive gear remains below the limit value for the circumferential pump speed.

In order to improve the mounting of the balancing shaft with the pumps on the cover plate, in accordance with the invention, the diameter of the first gear corresponds to the diameter of a bearing by which the balancing shaft is supported on a fluid conducting arrangement.

The most important advantage of the invention resides in the fact that, with the omission or, respectively, the shortening of the suction channels in the cover plate, the manufacture of the cover plate is facilitated. The three-chamber pumps of the state of the art are replaced by a simple one-chamber pump, that is, the pumps are simplified. The spur gear stage for driving the balancing shaft which is already present takes on an additional function as part of the first pump, that is, the integration degree is increased. With the arrangement of the first and the second pump on the balancing shaft an effective dry sump lubrication is realized with which the engine can still be operated in an inclined position.

The invention will become more readily apparent from the following description of two embodiments thereof on the basis of the accompanying drawings.

DESCRIPTION OF THE PREFERRED EMBODIMENTS

Figure 1:
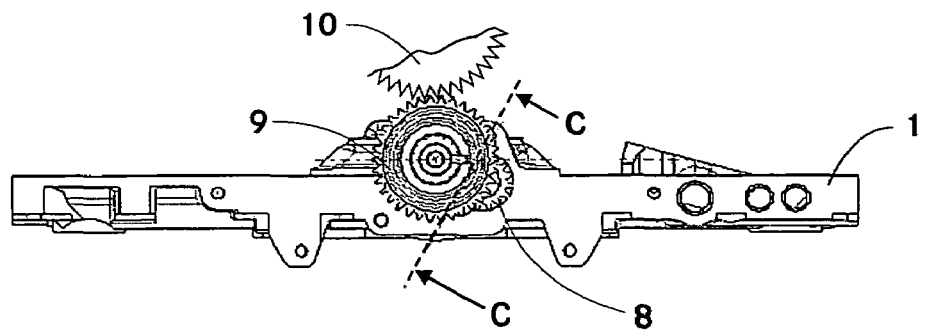
FIG. 1 shows the cover plate from the power output end KS of the engine.
Figure 2:
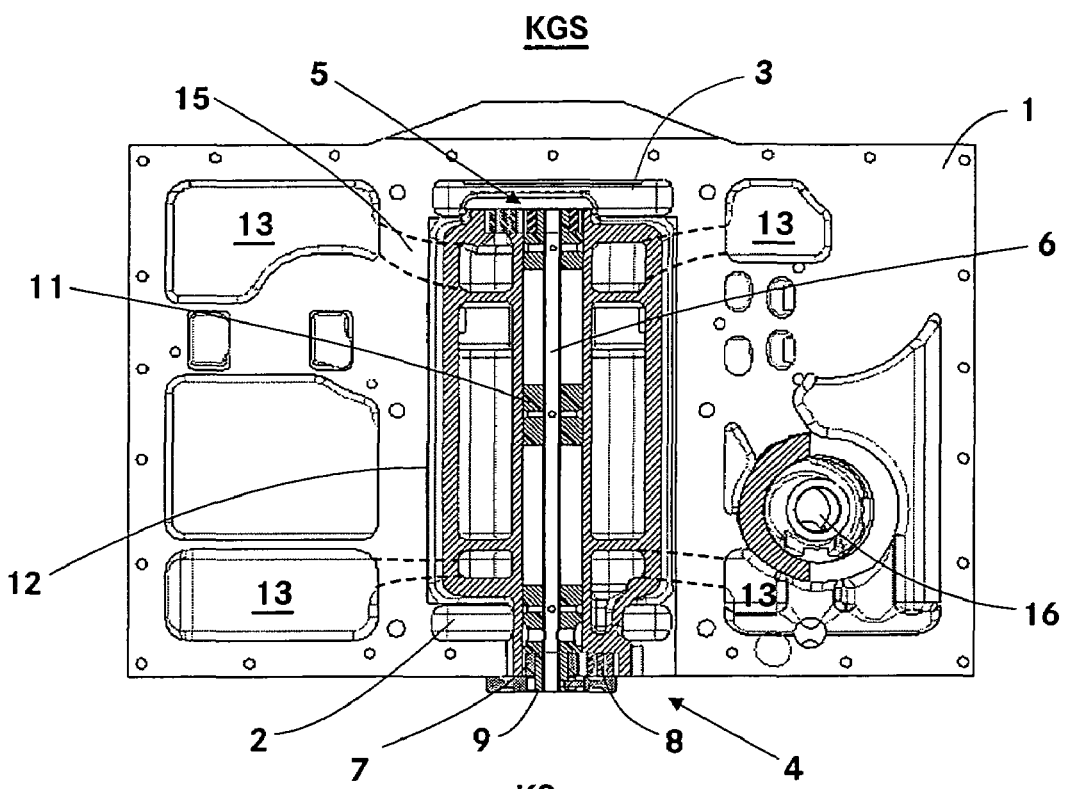
FIG. 2 is a top view of the cover plate.

FIG. 1 shows the cover plate 1 as seen form the power input end KS. It will be explained in connection also with FIGS. 2 and 3. It will be explained in connection also with FIGS. 2 and 3. In an internal combustion engine, the power end KS is the power output end of the internal combustion engine. At the power end KS for example, a clutch and a transmission are mounted onto the engine. Opposite the power end KS, there is the power output end KGS, see FIG. 2. In FIG. 1, the reference numeral 10 designates a drive gear which is mounted on the crankshaft. The drive gear 10 is in engagement with a driven gear 9, which is mounted on the balancing shaft 6. The two gears 9 and 10 form a spur gear stage. The balancing shaft 6 is supported in a fluid guide arrangement 12 by a bearing 11 by way of the fluid guide arrangement 12. The lubricant dripping from the engine drive elements is supplied to a first suction location 2 and a second suction location 3, see FIG. 2. At the force end KS of the balancing shaft 6, a first pump 4 is arranged. At the opposite end KGS of the balancing shaft 6, a second pump 5 is arranged. The first pump 4 and the second pump 5 are each formed by a first gear 7 and a second gear 8. Of course, also toroidal pumps can be used. In the representation of FIG. 2, the first pump 4 is disposed between the drive gear 9 and the second pump 5. With the two pumps 4 and 5, the lubricant is conducted from the two suction locations 2 and 3 via the pressure channels 15 to openings 13. The pressure channels 15 are shown in FIG. 2 by dashed lines. By way of the openings 13, the lubricant reaches the oil storage chambers of the crankcase. The reference numeral 16 designates a filter opening on the cover plate 1.

Figure 3:
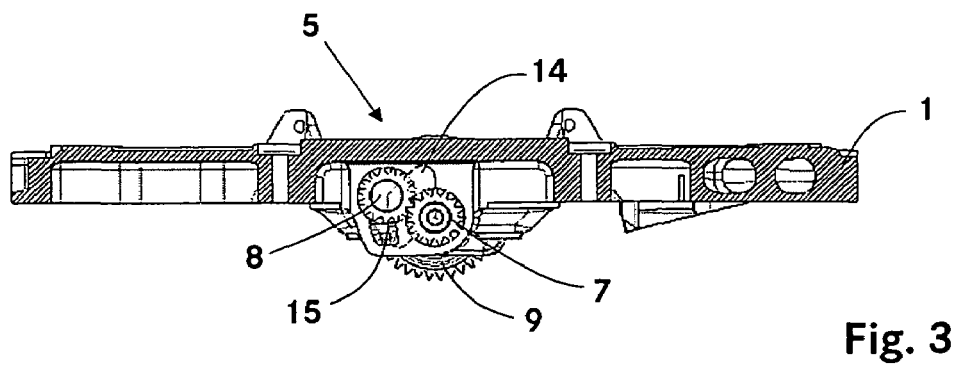
FIG. 3 shows the cover plate from the end KGS opposite that shown in FIG. 1.

FIG. 3 shows the cover plate 1 from the end opposite the force end KGS. The second pump 5, which is formed by the two gears 7 and 8, pumps the lubricant from the suction channel 14 to the pressure channel 15.

Figure 5:
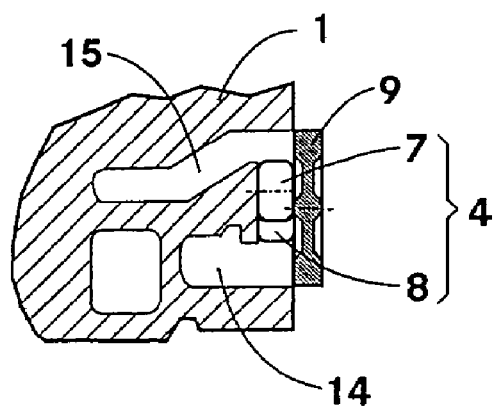
FIG. 5 is a sectional view of the cover plate taken along line C—C.

In FIG. 1, a section line CC is shown; the respective sectional view is shown in FIG. 5. From this sectional view, it is also apparent that the first pump 4 pumps the lubricant from the suction channel 14 to the pressure channel 15.

Figure 4:
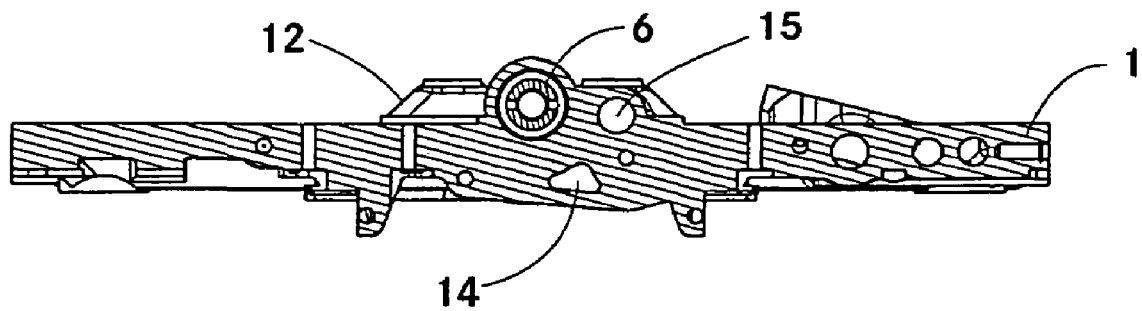
FIG. 4 is a cross-sectional view of the cover plate.

FIG. 4 is a sectional view of the cover plate 1. It shows the suction channels 14 and the pressure channel 15. This sectional view also shows the fluid guide structure 12 by way of which the lubricant dripping from the engine drive mechanism space is conducted to the first and the second collection location 2 and 3. In the fluid guide structure 12, the balancing shaft 6 is supported.

Figure 6:
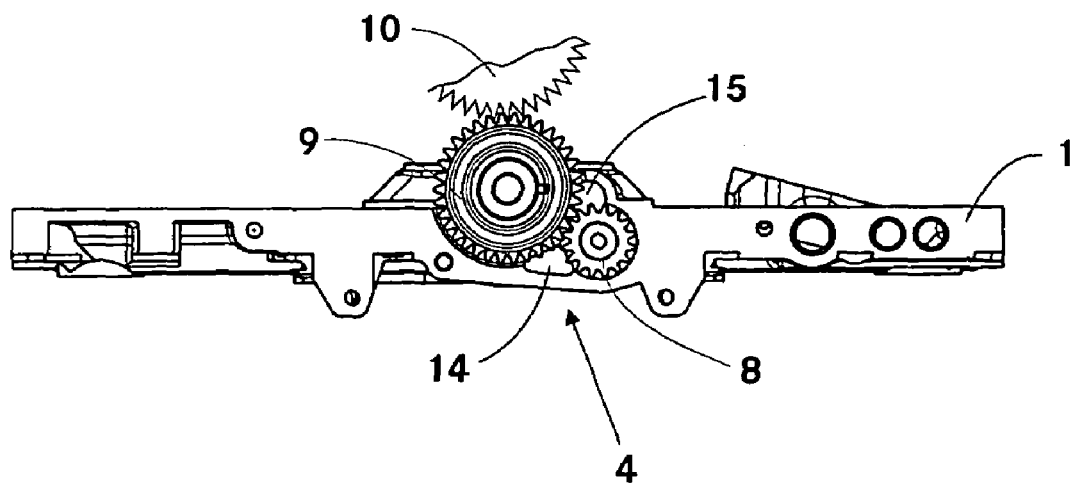
FIG. 6 shows a second embodiment of the cover plate from the power output end KS.
Figure 7:
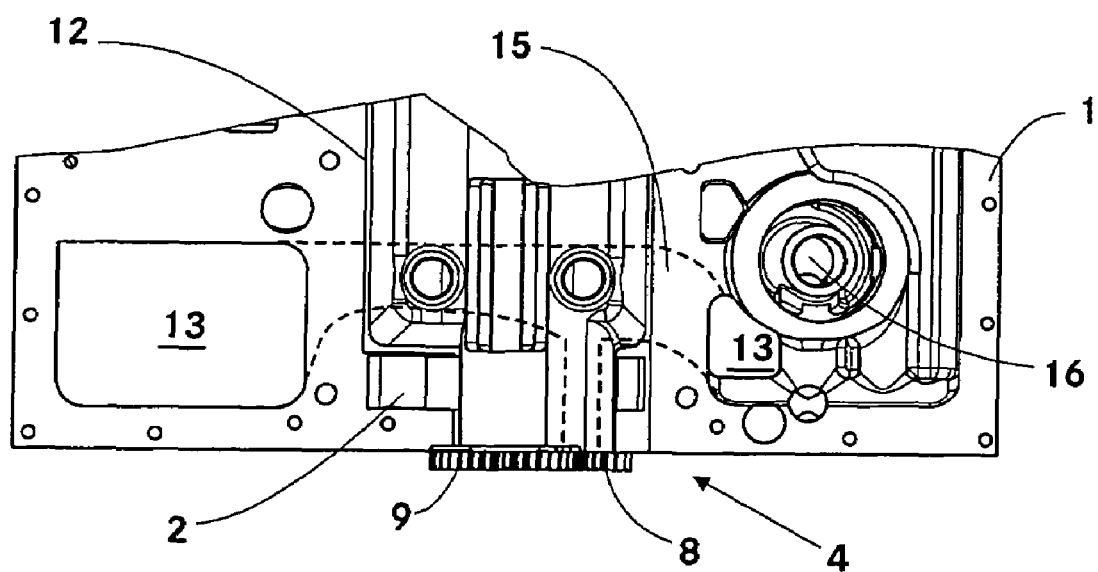
FIG. 7 is a partial top view of the cover plate at the power output end thereof.

FIG. 6 shows the cover plate 1 as seen from the force end KS. The further description is based on FIG. 7. In the embodiment shown in FIG. 7, the first pump 4 is formed by the drive gear 9 and the second gear 8. In comparison with the arrangement shown in FIG. 2, the first gear is omitted. This embodiment is provided for small circumferential speeds; that is, for internal combustion engines with a low speed level. The first pump 4 pumps the lubricant the suction chamber 14 from the first collection location 2 via the pressure channel 15 to the openings 13—see FIG. 7.

The advantages of the invention:

In comparison with the state of the art, the collection channels disposed between the suction locations and the pumps are omitted or, respectively, shortened whereby fewer core parts are needed during the manufacture of the cover plate, which results in cost advantages.

The spur gear stage takes on an additional function as part of the first pump which results in an increased degree of integration, The three chamber pumps of the state of the art are replaced by single chamber pumps of a more single design.

a safe dry sump lubrication is provided while the engine can still operate in an inclined position.

What is claimed is:

1. A cover plate (1) for obturating a crankcase of an internal combustion engine at the bottom end thereof, said cover plate (1) including collection areas (2, 3) for the collection of lubricant, a balancing shaft (6) rotatably supported on the cover plate (1) and having a force end (KS) at the power output end of the engine and an end opposite said force end (KS), a first pump (4) arranged at the force end (KS) of the balancing shaft (6) and having one gear thereof mounted on the balancing shaft (6) for pumping the lubricant from one (2) of the collection areas (2, 3) and a second pump (5) disposed at the end of the balancing shaft (6) opposite the force end (KS) and having one gear thereof mounted on the balancing shaft (6) for pumping the lubricant from the other (3) collection area.

2. A cover plate according to claim 1, wherein the first and the second pumps (4, 5) are each formed by a first gear (7) and a second gear (8).

3. A cover plate according to claim 2, wherein at the force end (KS) of the balancing shaft (6) a driven gear (9) is mounted on the balancing shaft (6) so as to be in engagement with a drive gear (10) of a crankshaft of the internal combustion engine and the first pump (4) is arranged between the driven gear (9) and the second pump (5).

4. A cover plate according to claim 3, wherein the balancing shaft (6) is supported by bearings (11) within a fluid guide structure (12) and the diameter of the first gear (7) corresponds to the diameter of the bearings (11).

5. A cover plate according to claim 2, wherein at the force end (KS) of the balancing shaft (6) a driven gear (9) is arranged which is in engagement with a drive gear (10) mounted on the crankshaft of the internal combustion engine and the first pump (4) is formed by the driven gear (9) of the balancing shaft (6) and the second gear (8).

* * * * *